United States Patent
Lee

(10) Patent No.: US 11,219,081 B2
(45) Date of Patent: Jan. 4, 2022

(54) METHOD AND ELECTRONIC DEVICE FOR NETWORK CONNECTION

(71) Applicant: Samsung Electronics Co., Ltd., Gyeonggi-do (KR)

(72) Inventor: Ki-Wan Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 769 days.

(21) Appl. No.: 16/071,184

(22) PCT Filed: Dec. 15, 2016

(86) PCT No.: PCT/KR2016/014754
§ 371 (c)(1),
(2) Date: Jul. 19, 2018

(87) PCT Pub. No.: WO2017/126809
PCT Pub. Date: Jul. 27, 2017

(65) Prior Publication Data
US 2021/0168890 A1 Jun. 3, 2021

(30) Foreign Application Priority Data
Jan. 22, 2016 (KR) .................. 10-2016-0008276

(51) Int. Cl.
*H04W 76/19* (2018.01)
*H04W 48/14* (2009.01)

(52) U.S. Cl.
CPC ........... *H04W 76/19* (2018.02); *H04W 48/14* (2013.01)

(58) Field of Classification Search
CPC ..... H04L 63/08; H04L 12/12; H04L 12/2807; H04L 63/10; H04W 76/14; H04W 84/18;
(Continued)

(56) References Cited

U.S. PATENT DOCUMENTS 9,843,929 B2* 12/2017 Zimmerman ......... H04L 9/0861
9,985,947 B1* 5/2018 Elhard .................... H04L 63/08
(Continued)

FOREIGN PATENT DOCUMENTS

CN 104580343 A 4/2015
CN 104662859 A 5/2015
(Continued)

OTHER PUBLICATIONS

European Search Report dated Oct. 25, 2018.
Chinese Search Report dated May 12, 2020.
Chinese Search Report dated Oct. 16, 2020.

*Primary Examiner* — Liton Miah
(74) *Attorney, Agent, or Firm* — Cha & Reiter, LLC

(57) ABSTRACT

The present invention relates to a method and an electronic device for network connection. The electronic device according to various embodiments comprises: a communication module; a processor electrically connected to the communication module; and a memory electrically connected to the processor, wherein, upon execution, the memory may store instructions that enable the processor to connect to a first network, to request connection information of a second electronic device with respect to the first network from the second electronic device when the connection of the first network is interrupted, and to connect to the first network on the basis of received connection information of the second electronic device with respect to the first network upon reception of the connection information of the second electronic device with respect to the first network. Other embodiments are also possible.

13 Claims, 10 Drawing Sheets

(58) Field of Classification Search
CPC ... H04W 12/06; H04W 12/069; H04W 12/50; H04W 40/22; H04W 48/08; H04W 60/00
See application file for complete search history.

(56) References Cited

U.S. PATENT DOCUMENTS

| | | | |
|---|---|---|---|
| 10,200,847 B2* | 2/2019 | Kim | H04W 4/80 |
| 2012/0099560 A1 | 4/2012 | Giaretta et al. | |
| 2013/0046881 A1* | 2/2013 | Seelman | H04L 12/2809 |
| | | | 709/224 |
| 2013/0173811 A1* | 7/2013 | Ha | H04L 12/2807 |
| | | | 709/227 |
| 2013/0227647 A1 | 8/2013 | Thomas et al. | |
| 2014/0153557 A1 | 6/2014 | Kim | |
| 2015/0103708 A1* | 4/2015 | Kang | H04W 52/0235 |
| | | | 370/311 |
| 2015/0139025 A1* | 5/2015 | Lee | H04W 12/50 |
| | | | 370/254 |
| 2016/0112250 A1 | 4/2016 | Hu et al. | |
| 2016/0183162 A1 | 6/2016 | Jeong et al. | |
| 2016/0345317 A1* | 11/2016 | Levesque | H04W 84/18 |
| 2016/0373270 A1 | 12/2016 | Yang et al. | |
| 2018/0027433 A1* | 1/2018 | Elliott | H04W 24/04 |
| | | | 370/216 |

FOREIGN PATENT DOCUMENTS

| | | |
|---|---|---|
| KR | 10-2014-0100768 A | 8/2014 |
| KR | 10-2014-0130501 A | 11/2014 |
| KR | 10-2015-0092873 A | 8/2015 |
| WO | 2011/056102 A1 | 5/2011 |
| WO | 2011/139962 A1 | 11/2011 |
| WO | 2015/069047 A1 | 5/2015 |
| WO | 2015/093906 A1 | 6/2015 |

* cited by examiner

METHOD AND ELECTRONIC DEVICE FOR NETWORK CONNECTION

This application is a National Phase Entry of PCT International Application No. PCT/KR2016/014754 which was filed on Dec. 15, 2016, and claims priority to Korean Patent Application No. 10-2016-0008276, which was filed on Jan. 22, 2016, the contents of which are incorporated herein by reference.

TECHNICAL FIELD

Various embodiments of the present disclosure relate to an electronic device for connecting to a first network on the basis of connection information of another electronic device.

BACKGROUND

Typically, in order to perform data communication, mobile terminals, such as smart phones or mobile phones, can connect to a cellular network, such as Long-Term Evolution (LTE), LTE-Advance (LTE-A), Code-Division Multiple Access (CDMA), or Wideband CDMA (WCDMA), and a Wireless Local Area Network Are (WLAN), such as Wi-Fi.

Recently, there have been an increasing number of users who use sub-devices, that is, devices, such as not only mobile terminals but also tablet Personal Computers (PCs), capable of connecting to a cellular communication network or a WLAN.

By using such sub-devices, a user can connect to the Internet through a cellular network, or can access an Access Point (AP) to connect to the Internet through a WLAN.

SUMMARY

As described above, conventionally, by using sub-devices, a user can connect to the Internet through a cellular network, or can access an AP to connect to the Internet through a WLAN.

Recently, there has been an increasing interest in a connection method for allowing a user to conveniently connect to the Internet by using a sub-device.

Therefore, when, while a sub-device connects to the Internet through a WLAN, the connection of the sub-device to the WLAN is interrupted, there is a need for a method for connecting, by the sub-device, to the WLAN by using WLAN connection information of a mobile terminal.

An aspect of the present disclosure provides an electronic device and a method for connecting to a network.

In accordance with an aspect of the present disclosure, an electronic device is provided. The electronic device includes: a communication module; a processor electrically connected to the communication module; and a memory electrically connected to the processor, wherein the memory may store instructions that, when executed, cause the processor to: make a connection to a first network; when the connection to the first network is interrupted, send, to a second electronic device, a request for connection information of the second electronic device for the first network; and when the connection information of the second electronic device for the first network is received, make a connection to the first network on the basis of the received connection information of the second electronic device for the first network.

In accordance with another aspect of the present disclosure, a method for connecting to a network by an electronic device is provided. The method may include: making a connection to a first network; when the connection to the first network is interrupted, sending, to a second electronic device, a request for connection information of the second electronic device for the first network; receiving the connection information of the second electronic device for the first network; and making a connection to the first network on the basis of the connection information of the second electronic device for the first network.

Advantageous Effects

In various embodiments of the present disclosure, even when the connection of a first electronic device to a first network is interrupted, without the need for a user to search for and select a device in order to connect to a network, the first electronic device can conveniently connect to the first network on the basis of connection information of a second electronic device for the first network provided by the second electronic device.

DETAILED DESCRIPTION OF THE DISCLOSURE

Figure 1:
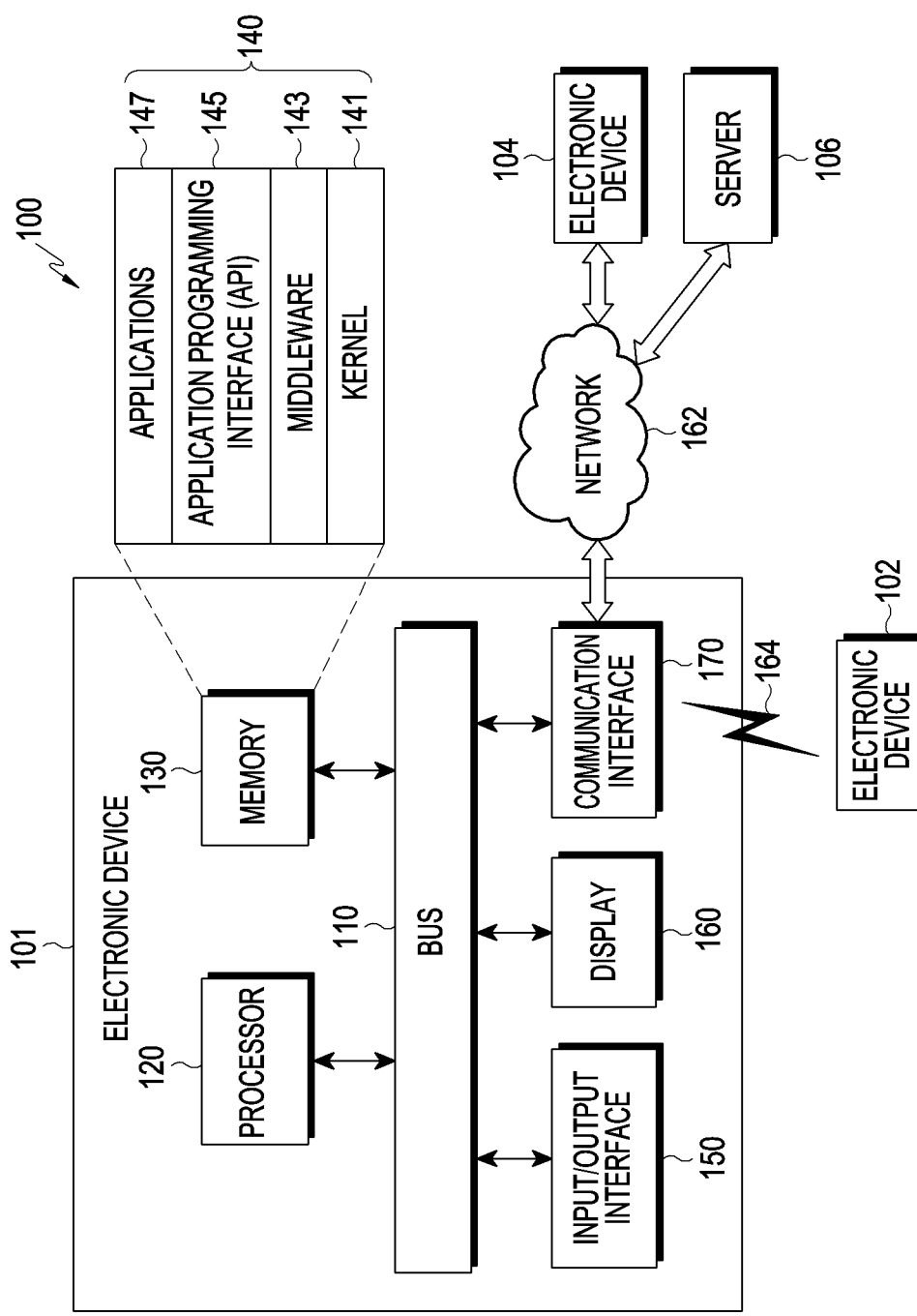
FIG. 1 illustrates a network environment including an electronic device according to various embodiments.

Hereinafter, various embodiments of the present disclosure will be described with reference to the accompanying drawings. It should be understood that the embodiments and the terms used herein are not intended to limit the present disclosure to the particular forms disclosed and the present disclosure aims to cover various modifications, equivalents, and/or alternatives of the corresponding embodiments. In describing the drawings, similar reference numerals may be used to designate similar elements. As used herein, the singular forms may include the plural forms as well, unless the context clearly indicates otherwise. In the present disclosure, the expression "A or B", "at least one of A and/or B", "A/B", or the like may include all possible combinations of the items listed. The expression "a first", "a second", "the first", or "the second" may modify corresponding elements regardless of the order or the importance thereof, and is used only to distinguish one element from another element, but does not limit the corresponding elements. When an element (e.g., a first element) is referred to as being (operatively or communicatively) "connected" or "coupled" to another element (e.g., a second element), the element may be connected directly to the another element or connected to the another element through any other element (e.g., a third element).

In the present disclosure, the expression "configured to" may be exchanged with, for example, "suitable for", "having the capacity to", "adapted to", "made to", "capable of", or "designed to" in terms of hardware or software, according to the circumstances. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric- or clothing-integrated type (e.g., an electronic clothing), a body-mounted type (e.g., a skin pad or tattoo), and a bio-implantable type (e.g., an implantable circuit). According to some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA) device, a Magnetic Resonance Imaging (MRI) device, a Computed Tomography (CT) machine, and an ultrasonic machine), a navigation device, a Global Navigation Satellite System (GNSS), an Event Data Recorder (EDR), a Flight Data Recorder (FDR), a vehicle infotainment device, electronic devices for a ship (e.g., a navigation device for a ship, a gyro-compass, etc.), avionics devices, security devices, an automotive head unit, a robot for home or industry, a drone, an Automated Teller Machine (ATM) in a bank, a Point-Of-Sales (POS) terminal in a shop, and an Internet-of-Things device (e.g., a light bulb, various sensors, a sprinkler device, a fire alarm, a thermostat, a streetlamp, a toaster, sporting goods, a hot water tank, a heater, a boiler, etc.). According to some embodiments, the electronic device may include at least one of a part of a piece of furniture, a building/structure, or a motor vehicle, an electronic board, an electronic signature-receiving device, a projector, and various kinds of measurement instruments (e.g., a water meter, an electric meter, a gas meter, and a radio wave meter). In various embodiments, the electronic device may be flexible, or may be a combination of two or more of the aforementioned various devices. The electronic device according to an embodiment of the present disclosure is not limited to the aforementioned devices. In the present disclosure, the term "user" may indicate a person using an electronic device or a device (e.g. an artificial intelligence electronic device) using an electronic device.

Referring to FIG. 1, a description will be made of an electronic device 101 in a network environment 100 according to various embodiments. The electronic device 101 may include a bus 110, a processor 120, a memory 130, an input/output interface 150, a display 160, and a communication interface 170. In some embodiments, at least one of the above elements of the electronic device 101 may be omitted from the electronic device 101, or the electronic device 101 may additionally include other elements.

The bus 110 may include, for example, a circuit that interconnects the elements 110 to 170 and delivers a communication (e.g., a control message and/or data) between the elements 110 to 170.

The processor 120 may include one or more of a Central Processing Unit (CPU), an Application Processor (AP), and a Communication Processor (CP). The processor 120 may perform, for example, calculations or data processing related to control over and/or communication by at least one of the other elements of the electronic device 101. The processor 120 may be referred to as "controller", may include the controller as a part thereof, or may constitute the controller.

The memory 130 may include a volatile memory and/or a non-volatile memory. The memory 130 may store, for example, commands or data related to at least one of the other elements of the electronic device 101. According to an embodiment, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an "Operating System (OS)."

For example, the kernel 141 may control or manage system resources (e.g., the bus 110, the processor 120, the memory 130, and the like) used to execute operations or functions implemented by the other programs (e.g., the middleware 143, the API 145, and the application program 147). Also, the kernel 141 may provide an interface capable of controlling or managing the system resources by accessing the individual elements of the electronic device 101 by using the middleware 143, the API 145, or the application program 147.

For example, the middleware 143 may serve as an intermediary that enables the API 145 or the application program 147 to communicate with the kernel 141 and to exchange data therewith.

Also, the middleware 143 may process one or more task requests received from the application program 147 according to a priority. For example, the middleware 143 may assign a priority, which enables the use of system resources (e.g., the bus 110, the processor 120, the memory 130, etc.) of the electronic device 101, to at least one of the application programs 147. For example, the middleware 143 may perform scheduling, load balancing, or the like of the one or more task requests by processing the one or more task requests according to the priority assigned to the at least one of the application programs 147.

The API 145 is, for example, an interface through which the application 147 controls a function provided by the kernel 141 or the middleware 143, and may include, for example, at least one interface or function (e.g., instruction) for file control, window control, image processing, character control, or the like.

For example, the input/output interface 150 may serve as an interface capable of delivering a command or data, which is input from a user or another external device, to the element(s) other than the input/output interface 150 within the electronic device 101. Also, the input/output interface 150 may output, to the user or another external device, commands or data received from the element(s) other than the input/output interface 150 within the electronic device 101.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. For example, the display 160 may display various pieces of content (e.g., text, images, videos, icons, symbols, etc.) to the user. The display 160 may include a touch screen, and may receive, for example, a touch input, a gesture input, a proximity input, or a hovering input provided by an electronic pen or a body part of the user.

The communication interface 170 may establish, for example, communication between the electronic device 101 and an external device (e.g., a first external electronic device 102, a second external electronic device 104, or a server 106). For example, the communication interface 170 may be connected to a network 162 via wireless or wired communication and may communicate with the external device (e.g., the second external electronic device 104 or the server 106).

The wireless communication may use, as a cellular communication protocol, at least one of, for example, Long-Term Evolution (L FE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM). Also, the types of wireless communication may include short-range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (GLONASS), a BeiDou Navigation Satellite System (hereinafter "BeiDou"), and a European Global Satellite-based Navigation System (Galileo), according to a use area, a bandwidth, or the like. Hereinafter, in the present disclosure, the term "GPS" may be used interchangeably with the term "GNSS." The types of wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks, such as a computer network (e.g., a Local Area Network (LAN), or a Wide Area Network (WAN)), the Internet, and a telephone network.

Each of the first and second external electronic devices 102 and 104 may be of a type identical to or different from that of the electronic device 101.

According to an embodiment, the server 106 may include a group of one or more servers.

According to various embodiments, all or some of operations performed by the electronic device 101 may be performed by another electronic device or multiple electronic devices (e.g., the first and second external electronic devices 102 and 104 or the server 106).

According to an embodiment, when the electronic device 101 needs to perform some functions or services automatically or by a request, the electronic device 101 may send, to another device (e.g., the first external electronic device 102, the second external electronic device 104, or the server 106), a request for performing at least some functions related to the functions or services, instead of performing the functions or services by itself, or additionally. Another electronic device (e.g., the first external electronic device 102, the second external electronic device 104, or the server 106) may execute the requested functions or the additional functions, and may deliver a result of the execution to the electronic device 101. The electronic device 101 may process the received result without any change or additionally and may provide the requested functions or services. To this end, use may be made of, for example, cloud computing technology, distributed computing technology, or client-server computing technology.

Figure 2:
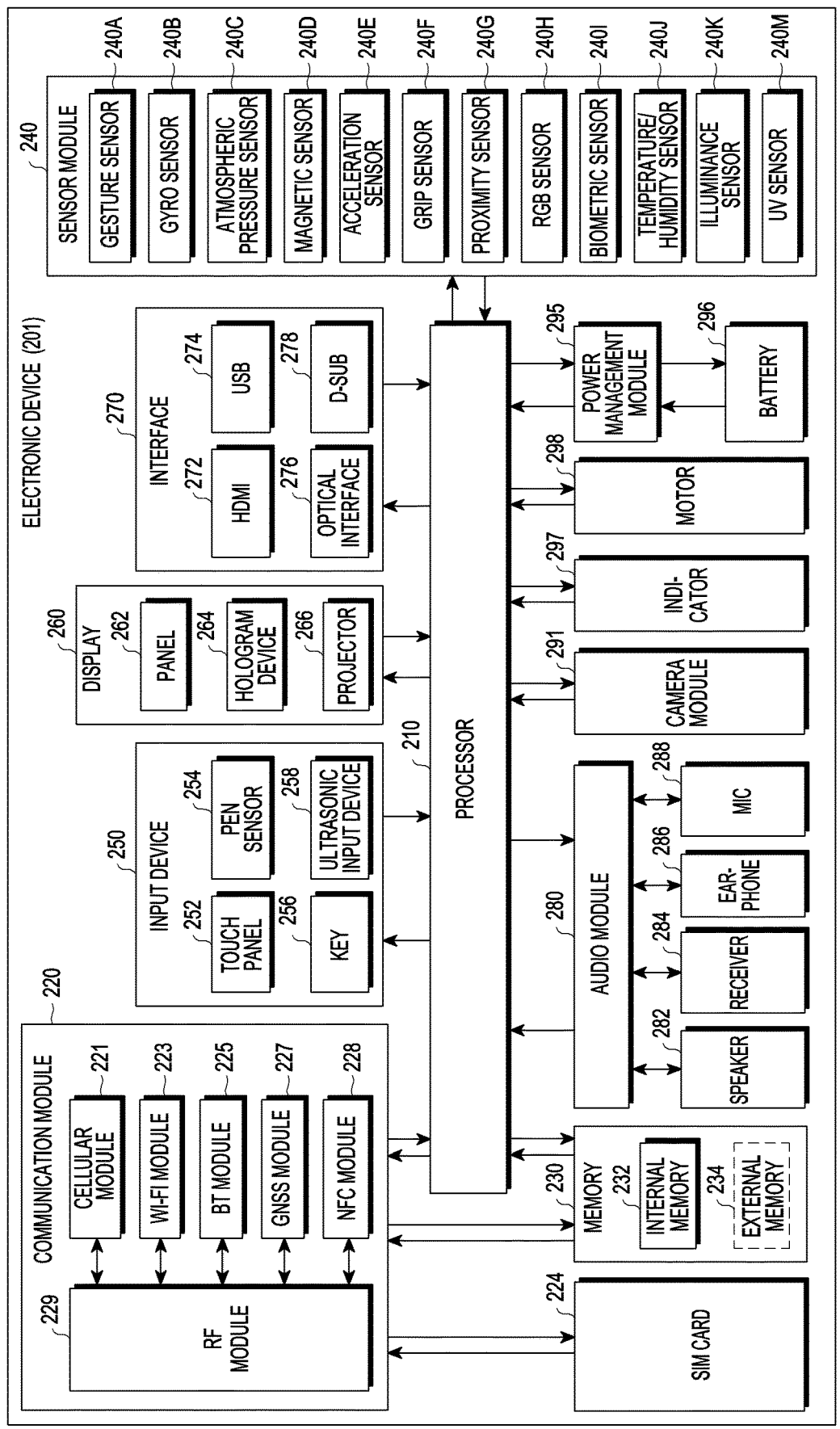
FIG. 2 illustrates a block diagram of an electronic device according to various embodiments.

FIG. 2 is a block diagram illustrating an electronic device according to various embodiments. For example, the electronic device 201 may include the whole or part of the electronic device 101 illustrated in FIG. 1. The electronic device 201 may include at least one processor (e.g., an AP) 210, a communication module 220, a subscriber identification module 224, a memory 230, a sensor module 240, an input apparatus 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an OS or an application program, and may perform the processing of and arithmetic operations on various data. The processor 210 may be implemented by, for example, a System on Chip (SoC). The processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, commands or data received from at least one (e.g., a non-volatile memory) of the other elements and may process the loaded commands or data, and may store various data in a non-volatile memory.

According to an embodiment, when a request for connection information of the electronic device 201 for a wireless LAN is received from an external device connected to the electronic device 201 via short-range communication (e.g., Bluetooth), the processor 210 may deliver, to the external device, the connection information of the electronic device 201 for a wireless LAN. When notification of wireless LAN connection failure is received from the external device, the processor 210 may perform a mobile AP function, may deliver device connection information of the electronic device 201 to the external device, and may be connected to the external device via communication. In the above-described operation, the electronic device 201 may operate as a host device, and the external device may be a user's sub-device pre-registered in the electronic device 201.

According to an embodiment, the processor 210 may send, to the external device connected to the electronic device 201 via short-range communication (e.g., Bluetooth), a request for connection information of the external device for a first network (e.g., Wi-Fi), and when the connection information of the external device for the first network is received, the processor 210 may connect to the first network on the basis of the received connection information. When the connection of the electronic device to the first network is interrupted, the processor 210 may send, to the external device, a request for connection information of the external device for the first network. When the connection information of the external device for the first network is received from the external device, the processor 210 may connect to the first network on the basis of the received connection information of the external device for the first network.

According to an embodiment, when the connection of the electronic device to the first network, which is made based on the connection information of the external device for the first network, fails or is interrupted, the processor 210 may send, to the external device, a request for connection information of the external device for a second network. When the connection information of the external device for the second network is received from the external device, the processor 210 may connect to the second network on the basis of the received connection information of the external device for the second network.

The communication module 220 may have a configuration identical or similar to that of the communication interface 170 illustrated in FIG. 1. The communication module 220 may include, for example, the cellular module 221, a Wi-Fi module 223, a Bluetooth (BT) module 225, a GNSS module 227 (e.g., a GPS module, a GLONASS module, a BeiDou module, or a Galileo module), an NFC module 228, and a Radio Frequency (RF) module 229.

For example, the cellular module 221 may provide a voice call, a video call, a text message service, an Internet service, and the like through a communication network. According to an embodiment, the cellular module 221 may identify or authenticate an electronic device 201 in the communication network by using the subscriber identification module (e.g., a Subscriber Identity Module (SIM) card) 224. According to an embodiment, the cellular module 221 may perform at least some of the functions that the processor 210 may provide. According to an embodiment, the cellular module 221 may include a CP.

Each of the Wi-Fi module 223, the BT module 225, the GNSS module 227, and the NFC module 228 may include, for example, a processor for processing data transmitted and received through the relevant module. According to some embodiments, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit and receive, for example, communication signals (e.g., RF signals). The RF module 229 may include, for example, a transceiver, a Power Amplifier Module (PAM), a frequency filter, a Low Noise Amplifier (LNA), and an antenna. According to another embodiment, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of: a volatile memory (e.g., a Dynamic Random Access Memory (DRAM), a Static RAM (SRAM), a Synchronous DRAM (SDRAM), etc.); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a Not AND (NAND) flash memory, a Not OR (NOR) flash memory, etc.), a hard drive, and a Solid State Drive (SSD)).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red-Green-Blue (RGB) sensor), a biometric sensor 240I, a temperature/humidity sensor 240J, an illuminance sensor 240K, and an Ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input apparatus 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an acoustic wave scheme. Also, the touch panel 252 may further include a control circuit. The touch panel 252 may further include a tactile layer and may provide a tactile reaction to the user.

The (digital) pen sensor 254 may include, for example, a recognition sheet which is a part of the touch panel or is separated from the touch panel. The key 256 may be, for example, a physical button, an optical key, and a keypad. The ultrasonic input unit 258 may sense an ultrasonic wave generated by an input means through a microphone (e.g., a microphone 288), and may confirm data corresponding to the sensed ultrasonic wave.

The display 260 (e.g., the display 160) may include a panel 262, a hologram unit 264, or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram unit 264 may display a three-dimensional image in the air by using the interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram unit 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 145 illustrated in FIG. 1. The audio module 280 may process sound information which is input or output through, for example, a speaker 282, a receiver 284, an earphone 286, the microphone 288, or the like.

The camera module 291 is, for example, a device capable of capturing a still image and a moving image. According to an embodiment, the camera module 291 may include one or more image sensors (e.g., a front sensor or a back sensor), a lens, an Image Signal Processor (ISP), and a flash (e.g., an LED, a xenon lamp, or the like).

The power management module 295 may manage, for example, power of the electronic device 201. According to an embodiment, the power management module 295 may include a Power Management Integrated Circuit (PMIC), a charger IC, or a battery fuel gauge. The PMIC may use a wired and/or wireless charging method. Examples of the wireless charging method may include, for example, a magnetic resonance method, a magnetic induction method, an electromagnetic method, and the like. The PMIC may further include additional circuits (e.g., a coil loop, a resonance circuit, a rectifier, etc.) for wireless charging. The battery fuel gauge may measure, for example, a remaining charge amount of the battery 296, and a voltage, a current, or a temperature during the charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like.

Although not illustrated, the electronic device 201 may include a processing unit (e.g., a GPU) for supporting a mobile television (TV). The processing unit for supporting a mobile TV may process media data according to a standard, such as, for example, Digital Multimedia Broadcasting (DMB), Digital Video Broadcasting (DVB), or mediaFLO™.

Each of the above-described elements according to the present disclosure may be configured with one or more components, and the names of the corresponding elements may vary based on the type of electronic device. The electronic device according to various embodiments may include at least one of the above-described elements. Some of the above-described elements may be omitted from the electronic device, or the electronic device may further include other additional elements. Also, some of the elements of the electronic device according to various embodiments may be combined into one entity, which may perform functions identical to those of the relevant elements before the combination.

Figure 3:
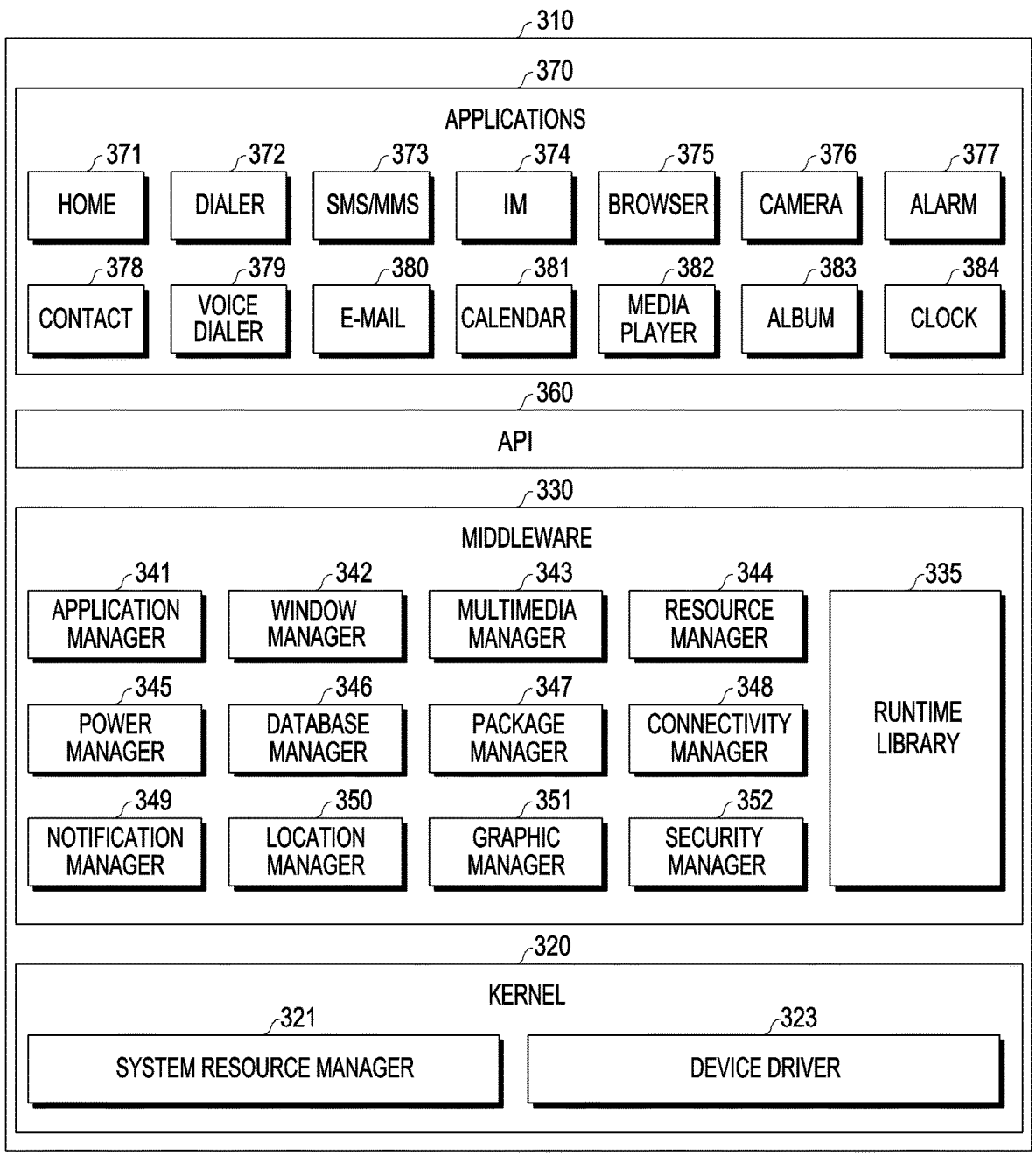
FIG. 3 illustrates a block diagram of a program module according to various embodiments.

FIG. 3 is a block diagram illustrating a program module according to various embodiments. According to an embodiment of the present disclosure, the program module 310 (e.g., the program 140) may include an OS for controlling resources related to the electronic device (e.g., the electronic device 101) and/or various applications (e.g., the application programs 147) executed in the OS. The OS may be, for example, Android, iOS, Windows, Symbian, Tizen, Bada, and the like.

The program module 310 may include a kernel 320, middleware 330, an API 360, and/or an application 370. At least some of the program module 310 may be preloaded on the electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine formats required to reproduce various media files, and may encode or decode a media file by using a coder/decoder (codec) appropriate for the relevant format. The resource manager 344 may manage resources, such as a source code of at least one of the applications 370, a memory or storage space for the at least one of the applications 370, and the like.

For example, the power manager 345 may operate together with a Basic Input/Output System (BIOS), etc. and may manage a battery or power, and may provide power information and the like required for an operation of the electronic device. The database manager 346 may generate, search, or change a database to be used by at least one of the applications 370. The package manager 347 may manage the installation or update of an application distributed in the form of a package file.

The connectivity manager 348 may manage a wireless connection, such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform, and in the case of Tizen, two or more API sets may be provided for each platform.

The application 370 (e.g., the application program 147) may include one or more applications capable of performing functions, such as, for example, a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a clock 384, health care (e.g., which measures an exercise quantity, a blood sugar level, or the like), and provision of environmental information (e.g., information on atmospheric pressure, humidity, temperature, or the like).

According to an embodiment, the application 370 may include an application (hereinafter, referred to as an "information exchange application" for convenience of description) supporting information exchange between the electronic device (e.g., the electronic device 101) and an external electronic device (e.g., the electronic device 102 or 104). The information exchange application may include, for example, a notification relay application for delivering particular information to an external electronic device or a device management application for managing an external electronic device.

For example, the notification relay application may include a function of delivering, to the external electronic device (e.g., the electronic device 102 or 104), notification information generated by the other applications (e.g., the SMS/MMS application, the email application, the health care application, the environmental information application, etc.) of the electronic device 101. Also, for example, the notification relay application may receive notification information from the external electronic device and may provide the received notification information to the user.

The device management application may manage (e.g., install, delete, or update), for example, at least one function (e.g., turning on/off the external electronic device itself (or some elements thereof) or adjusting the brightness (or resolution) of the display) of the external electronic device (e.g., the electronic device 102 or 104) communicating with the electronic device, an application executed in the external electronic device, or a service (e.g., a telephone call service, a message service, or the like) provided by the electronic device.

According to an embodiment, the application 370 may include an application (e.g., a health care application of a mobile medical device or the like) designated according to an attribute of the external electronic device (e.g., the electronic device 102 or 104). According to an embodiment, the application 370 may include an application received from the external electronic device (e.g., the server 106, or the electronic device 102 or 104). According to an embodiment, the application 370 may include a preloaded application or a third party application which can be downloaded from the server. The names of the elements of the program module 310, according to the embodiment illustrated in FIG. 3, may vary according to the type of OS.

Figure 4:
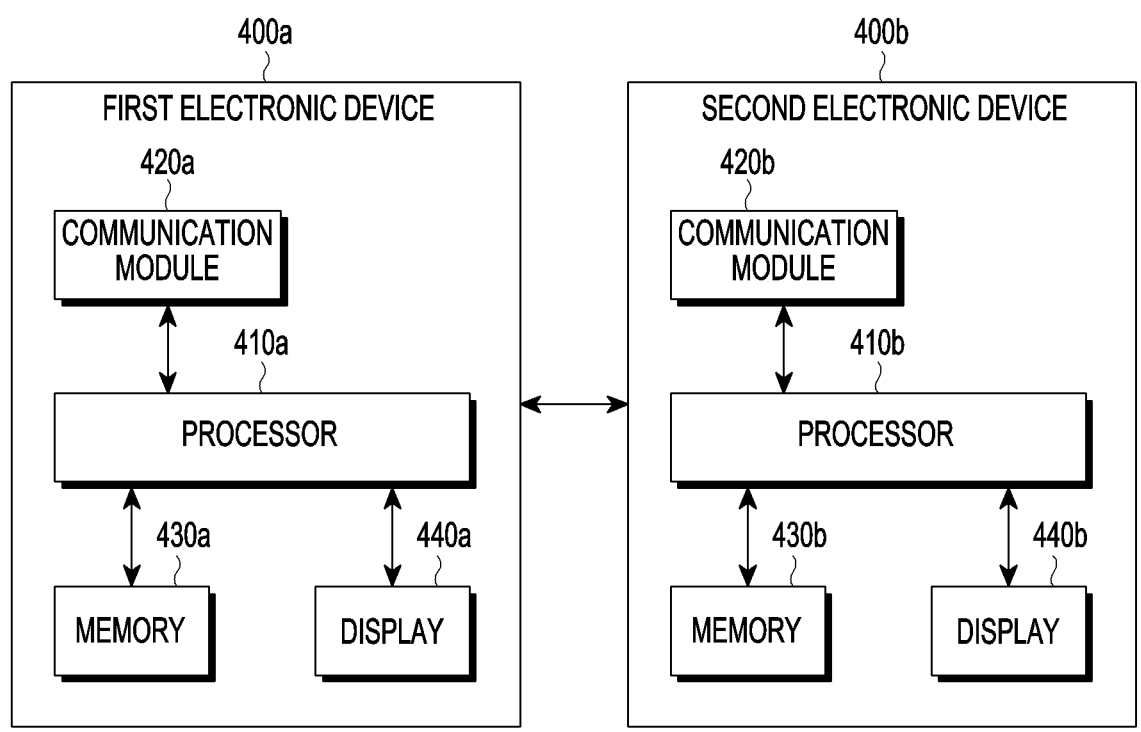
FIG. 4 is a view illustrating a configuration of each of a first electronic device and a second electronic device according to various embodiments.

FIG. 4 is a view illustrating a configuration of each of a first electronic device and a second electronic device according to various embodiments.

Referring to FIG. 4, the first electronic device 400a may be a sub-device (e.g., a tablet PC) of the second electronic device 400b, and the second electronic device 400b may be a main device (e.g., a portable terminal or a smart phone) of the first electronic device 400a.

Referring to FIG. 4, the first electronic device 400a may include a processor 410a, a communication module 420a, a memory 430a, and a display 440a.

The processor 410a of the first electronic device 400a may control overall operations of the communication module 420a, the memory 430a, and the display 440a.

According to an embodiment, the processor 410a may broadcast a beacon signal including device information (e.g., access information) of the first electronic device 400a. When first communication connection information (e.g., access information of the second electronic device 400b) for a connection for first communication (e.g., Bluetooth) is received from the second electronic device 400b, the processor 410a may establish a first communication connection with the second electronic device 400b on the basis of the received first communication connection information.

According to an embodiment, when a connection request for a first network is received, the processor 410a may connect to the first network. According to an embodiment, the first network may be a wireless LAN such as Wi-Fi. For example, the processor 410a may access a first network access apparatus (e.g., an AP) and may connect to the first network.

According to an embodiment, when the connection of the first electronic device 400a to the first network is interrupted (or fails), the processor 410a may deliver, to the second electronic device 400b, notification (or notice) for notifying of interruption of the connection to the first network. The notification may include a request for requesting connection information of the second electronic device 400b for the first network.

According to various embodiments, when the connection of the first electronic device 400a to the first network is interrupted (or fails), the processor 410a may send a request for a network connection state of the second electronic device 400b, to the second electronic device 400b via the first communication. The network connection state of the second electronic device 400b may be information on a network to which the second electronic device 400b is being connected. For example, the information on the network to which the second electronic device 400b is being connected may include the name, type, and the like of the network to which the second electronic device 400b is being connected.

When the network connection state of the second electronic device 400b is received from the second electronic device 400b, the processor 410a may check information on the network to which the second electronic device 400b is being connected.

For example, when the second electronic device 400b is being connected to the first network, the processor 410a may send a request for connection information for the first network to which the second electronic device 400b is currently being connected, to the second electronic device 400b via the first communication.

For example, when the second electronic device 400b is being connected to a second network or is not connected to any network, the processor 410a may send a request for connection information for the first network to which the second electronic device 400b has previously been connected, to the second electronic device 400b via the first communication.

According to an embodiment, the processor 410a may receive connection information of the second electronic device 400b for the first network, that is, a response to notification of interruption of the connection to the first network, from the second electronic device 400b through the communication module 420a. For example, the connection information of the second electronic device 400b for the first network may include connection information for the first network to which the second electronic device 400b is being connected, or connection information for the first network to which the second electronic device 400b has previously been connected. The connection information may include the name, a Personal Identification Number (PIN), and the like of at least one first network access apparatus (e.g., an AP).

The processor 410a may connect to the first network on the basis of the received connection information of the second electronic device 400b for the first network.

When the connection of the first electronic device 400a to the first network, which is made using the connection information of the second electronic device 400b for the first network, is interrupted (or fails), in order to connect to the second network, the processor 410a may send, to the second electronic device 400b, a request for connection information of the second electronic device 400b for the second network. According to an embodiment, the second network may be a cellular network such as third Generation (3G) or fourth Generation (4G). The connection information of the second electronic device 400b for the second network may be access information (e.g., name or PIN number) of the second electronic device 400b.

When the connection information of the second electronic device 400b for the second network is received from the second electronic device 400b, the processor 410a may connect to the second network on the basis of the connection information of the second electronic device 400b for the second network. For example, the processor 410a may connect to the second electronic device 400b on the basis of the received access information of the second electronic device 400b, and may connect to the second network through the second electronic device 400b. In the present example, the second electronic device 400b may operate as an AP for the second network.

According to various embodiments, when the first electronic device 400a and the second electronic device 400b are connected to each other via first communication (e.g., Bluetooth), if the connection of the first electronic device 400a to the first network is interrupted (or fails), the processor 410a may deliver a notification message for notifying of interruption of the connection to the first network, to the second electronic device 400b via the first communication.

According to various embodiments, when the first electronic device 400a and the second electronic device 400b are not connected to each other via the first communication (e.g., Bluetooth), the processor 410a may periodically deliver a beacon signal to the second electronic device 400b. For example, a beacon signal may include device information of the first electronic device 400a, and the device information thereof may include access information including the name, PIN number, and the like thereof. When access information for a connection for the first communication is received from the second electronic device 400b, the processor 410a may establish a first communication connection with the second electronic device 400b on the basis of the received access information. Thereafter, when the connection of the first electronic device 400a to the first network is interrupted (or fails), the processor 410a may deliver a notification message for notifying of interruption of the connection to the first network, to the second electronic device 400b via the first communication.

The communication module 420a may deliver a request to the second electronic device 400b, and may receive a response from the second electronic device 400b.

The memory 430a may store connection information of the second electronic device 400b for the first or second network which has been received from the second electronic device 400b, and may store all pieces of information exchanged with the second electronic device 400b through the first communication connection.

The display 440a may display various types of content to a user, or may include a touch screen and may receive an input through the touch screen. According to an embodiment, the display 440a may display a user interface for connecting to the first network. When the display 440a includes a touch screen, if an input signal for connecting to the first network is received through the touch screen, the display 440a may deliver the received input signal to the processor 410a.

Referring to FIG. 4, the second electronic device 400b may include a processor 410b, a communication module 420b, a memory 430b, and a display 440b.

The processor 410b of the second electronic device 400b may control overall operations of the communication module 420b, the memory 430b, and the display 440b.

According to an embodiment, the processor 410b may receive, from the first electronic device 400a, a beacon signal including device information (e.g., access information) of the first electronic device 400a. The processor 410b may determine whether the first electronic device 400a is a pre-registered sub-device, on the basis of device information of the first electronic device 400a included in the received beacon signal. For example, the processor 410b may pre-store device information of the first electronic device 400a in the memory 430b, and may determine whether the first electronic device 400a is a pre-registered sub-device, by comparing device information of the first electronic device 400a included in the received beacon signal with the device information of the first electronic device 400a stored in the memory 430b.

When the first electronic device 400a is a pre-registered sub-device, the processor 410b may deliver, to the first electronic device 400a, connection information for a connection for the first communication. By this configuration, the first electronic device 400a and the second electronic device 400b may establish a first communication connection therebetween.

According to an embodiment, when notification of interruption of the connection to the first network is received from the first electronic device 400a, the processor 410b may deliver, to the first electronic device 400a, connection information of the second electronic device 400b for the first network. The connection information of the second electronic device 400b for the first network may include connection information for the first network to which the second electronic device 400b is being connected, or connection information for the first network to which the second electronic device 400b has previously been connected. The connection information may be access information of at least one access apparatus (e.g., an AP) which is stored in the memory 430b of the second electronic device 400b in order to connect to the first network. For example, access information of at least one access apparatus may include the name, PIN number, and the like of an AP that the second electronic device 400b has accessed in order to connect to the first network. Also, the access information of at least one access apparatus may further include: a device list including at least one AP, which the second electronic device 400b has previously accessed in order to connect to the first network; and the name, PIN number, and the like of the at least one AP.

By this configuration, the first electronic device 400a may connect to the first network on the basis of the connection information of the second electronic device 400b for the first network.

According to various embodiments, the processor 410b may receive, from the first electronic device 400a, a request for a network connection state of the second electronic device 400b. The processor 410b may deliver the network connection state of the second electronic device 400b, which includes information on a network to which the second electronic device 400b is being connected, as a response to the request.

When a request for connection information for the second network is received from the first electronic device 400a, the processor 410b may deliver, to the first electronic device 400a, a response including connection information of the second electronic device 400b for the second network. The connection information of the second electronic device 400b for the second network may be access information of the second electronic device 400b. The connection information of the second electronic device 400b for the second network may include the name, PIN number, and the like of the second electronic device 400b. The second electronic device 400b may operate as an AP configured to connect to the second network.

By this configuration, the first electronic device 400a may connect to the second electronic device 400b on the basis of the connection information of the second electronic device 400b for the second network, and may connect to the second network through the second electronic device 400b.

The communication module 420b may receive a request from the first electronic device 400a, and may deliver a response to the first electronic device 400a.

The memory 430b may store connection information of the second electronic device 400b for the first or second network. Also, the memory 430b may store access information for the first electronic device 400a, or may store all pieces of information exchanged with the first electronic device 400a through the first communication connection.

The display 440b may display various types of content to a user, or may include a touch screen and may receive an input through the touch screen.

Figure 5:
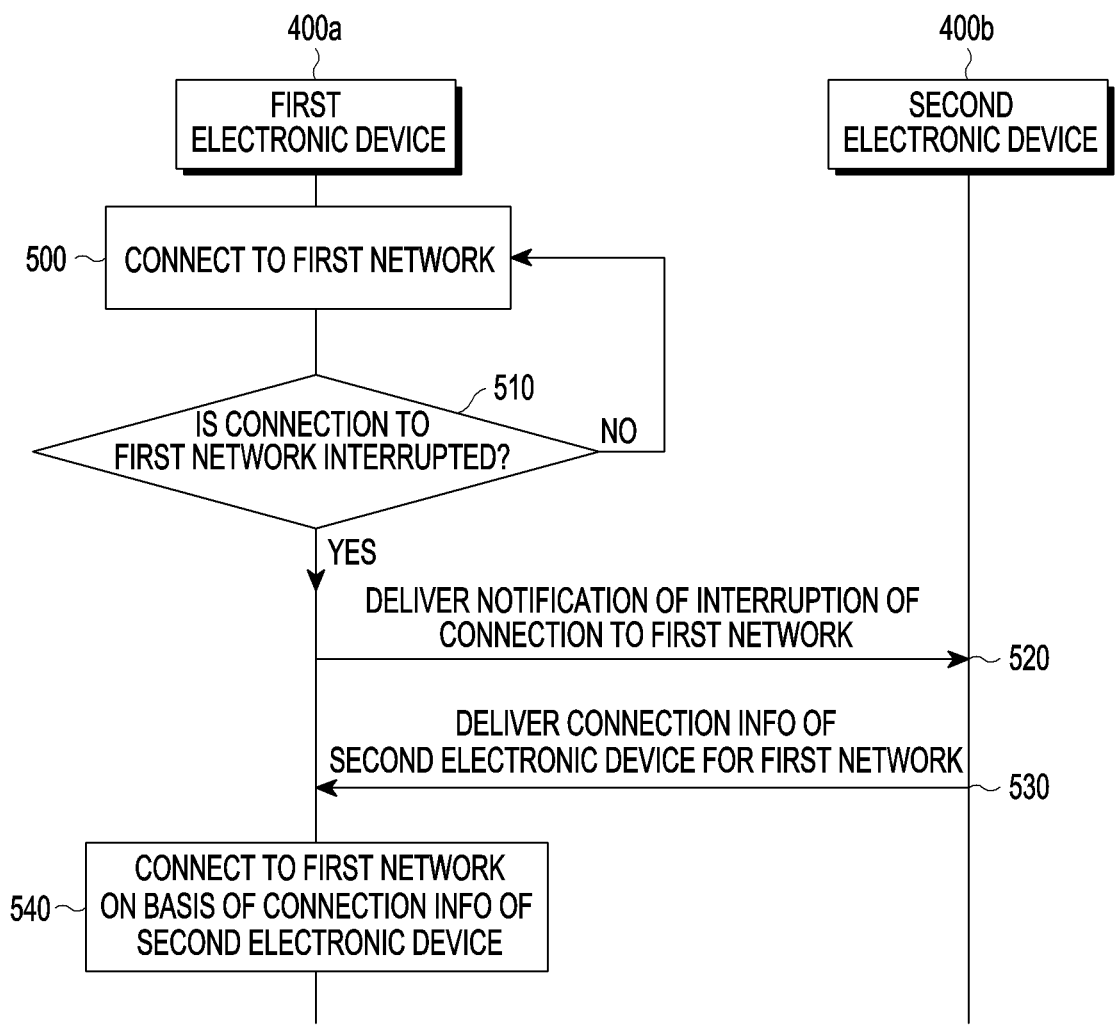
FIG. 5 illustrates a flow diagram between a first electronic device and a second electronic device for connecting, by the first electronic device, to a first network when the connection between the first electronic device and the first network is interrupted (or fails) according to various embodiments.

FIG. 5 illustrates a flow diagram between a first electronic device and a second electronic device for connecting, by the first electronic device, to a first network when the connection between the first electronic device and the first network is interrupted (or fails) according to various embodiments.

In operation 500, the first electronic device 400a may connect to the first network (e.g., a wireless LAN). According to an embodiment, the second electronic device 400b may connect to the first network or a second network (e.g., 3G or 4G).

In operation 510, the first electronic device 400a may determine whether the connection of the first electronic device 400a to the first network is interrupted. When the connection of the first electronic device 400a to the first network is interrupted, in operation 520, the first electronic device 400a may deliver, to the second electronic device 400b, notification of interruption of the connection to the first network. When the connection of the first electronic device 400a to the first network is uninterrupted, in operation 500, the first electronic device 400a may be continuously connected to the first network. In the present example, in order to deliver notification of interruption of the connection to the first network, the first electronic device 400a may activate the communication module 420a and may establish a connection (e.g., Bluetooth or WiFi-Direct) with the second electronic device 400b. Also, the first electronic device 400a may send, to the second electronic device 400b, a request for connection information for the first network.

In operation 530, the second electronic device 400b may deliver, to the first electronic device 400a, connection information of the second electronic device 400b for the first network.

The connection information of the second electronic device 400b for the first network may include connection information for the first network to which the second electronic device 400b is being connected, or connection information for the first network to which the second electronic device 400b has previously been connected.

In operation 540, the first electronic device 400a may connect to the first network on the basis of the connection information of the second electronic device 400b for the first network.

Figure 6:
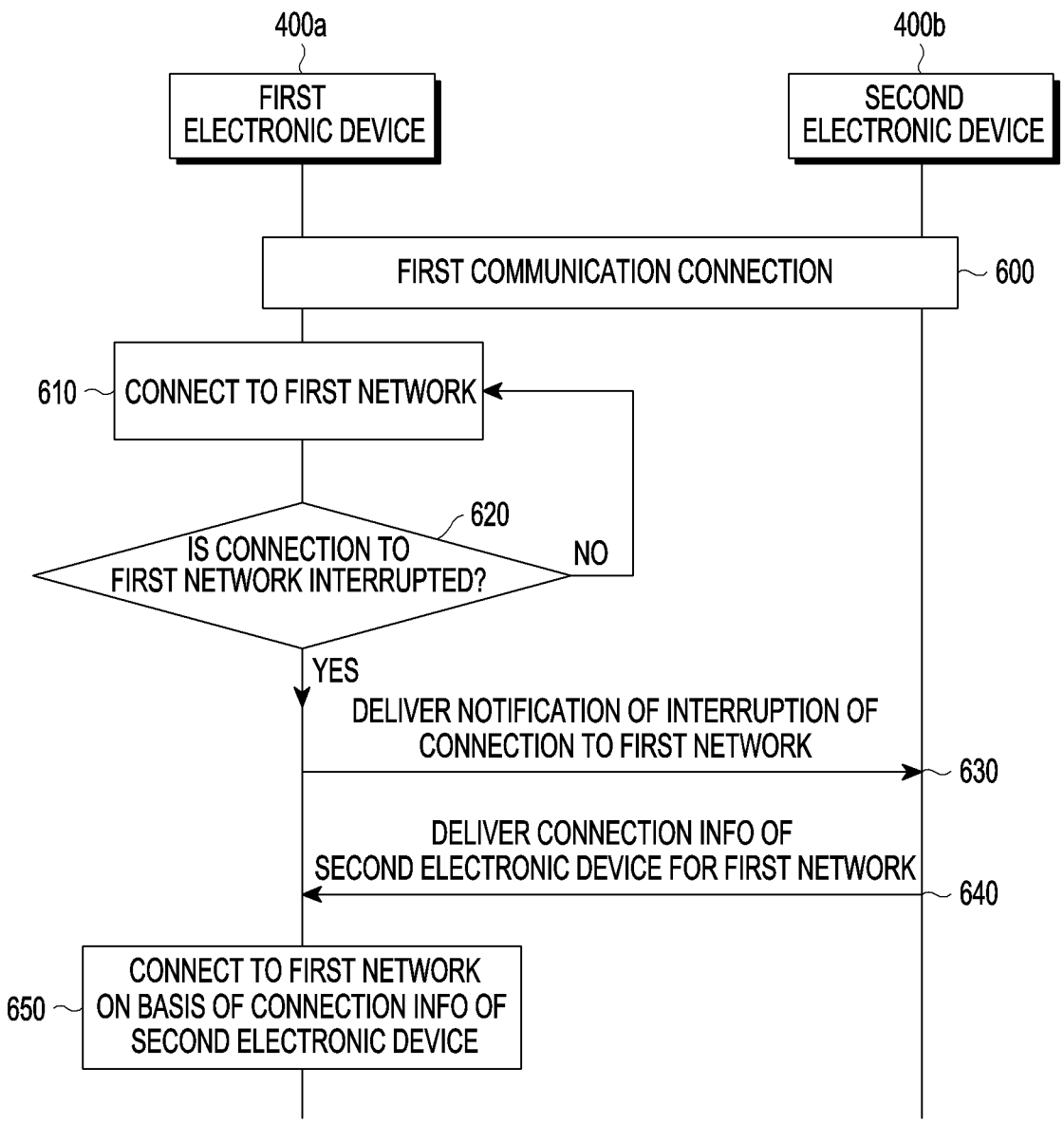
FIG. 6 illustrates a flow diagram between a first electronic device and a second electronic device for connecting, by the first electronic device, to a first network via first communication established between the first electronic device and the second electronic device according to various embodiments.

FIG. 6 illustrates a flow diagram between a first electronic device and a second electronic device for connecting, by the first electronic device, to a first network via first communication established between the first electronic device and the second electronic device according to various embodiments.

Referring to FIG. 6, in operation 600, the first electronic device 400a (e.g., the processor 410a) and the second electronic device 400b (e.g., the processor 410b) may establish a first communication connection therebetween. For example, the first communication may include at least one of short-range communication schemes, including Wi-Fi, Bluetooth, NFC, and GNSS.

In operation 610, the first electronic device 400a may connect to the first network (e.g., a wireless LAN). Operations 600 and 610 may be performed in order, or operation 610 may be performed before operation 600.

In operation 620, the first electronic device 400a may determine whether the connection thereof to the first network is interrupted. When the connection thereof to the first network is interrupted, the first electronic device 400a may perform operation 630. In contrast, when the connection thereof to the first network is uninterrupted, the first electronic device 400a may return to operation 610 and may be continuously connected to the first network.

In operation 630, the first electronic device 400a may deliver notification of interruption of the connection to the first network, to the second electronic device 400b via the first communication. For example, the first electronic device 400a may deliver notification of interruption of the connection to the first network in a state of including a request for connection information of the second electronic device 400b for the first network.

In operation 640, the second electronic device 400b may deliver the connection information of the second electronic device 400b for the first network, to the first electronic device 400a via the first communication.

In operation 650, the first electronic device 400a may connect to the first network on the basis of the connection information of the second electronic device 400b for the first network.

According to various embodiments, the second electronic device 400b may determine whether the first electronic device 400a is a sub-device related thereto, by using access information of the first electronic device 400a. For example, access information of the first electronic device 400a may be access information of the first electronic device 400a pre-registered in the second electronic device 400b, or may be access information of the first electronic device 400a which, in order to establish a first communication connection, has been delivered to the second electronic device 400b and is stored in the second electronic device 400b.

When the first electronic device 400a is determined to be a sub-device related to the second electronic device 400b, the second electronic device 400b may deliver, to the first electronic device 400a, connection information of the second electronic device 400b for the first network. In contrast, when the first electronic device 400a is not a sub-device related to the second electronic device 400b, the second electronic device 400b may terminate the operation thereof.

Figure 7:
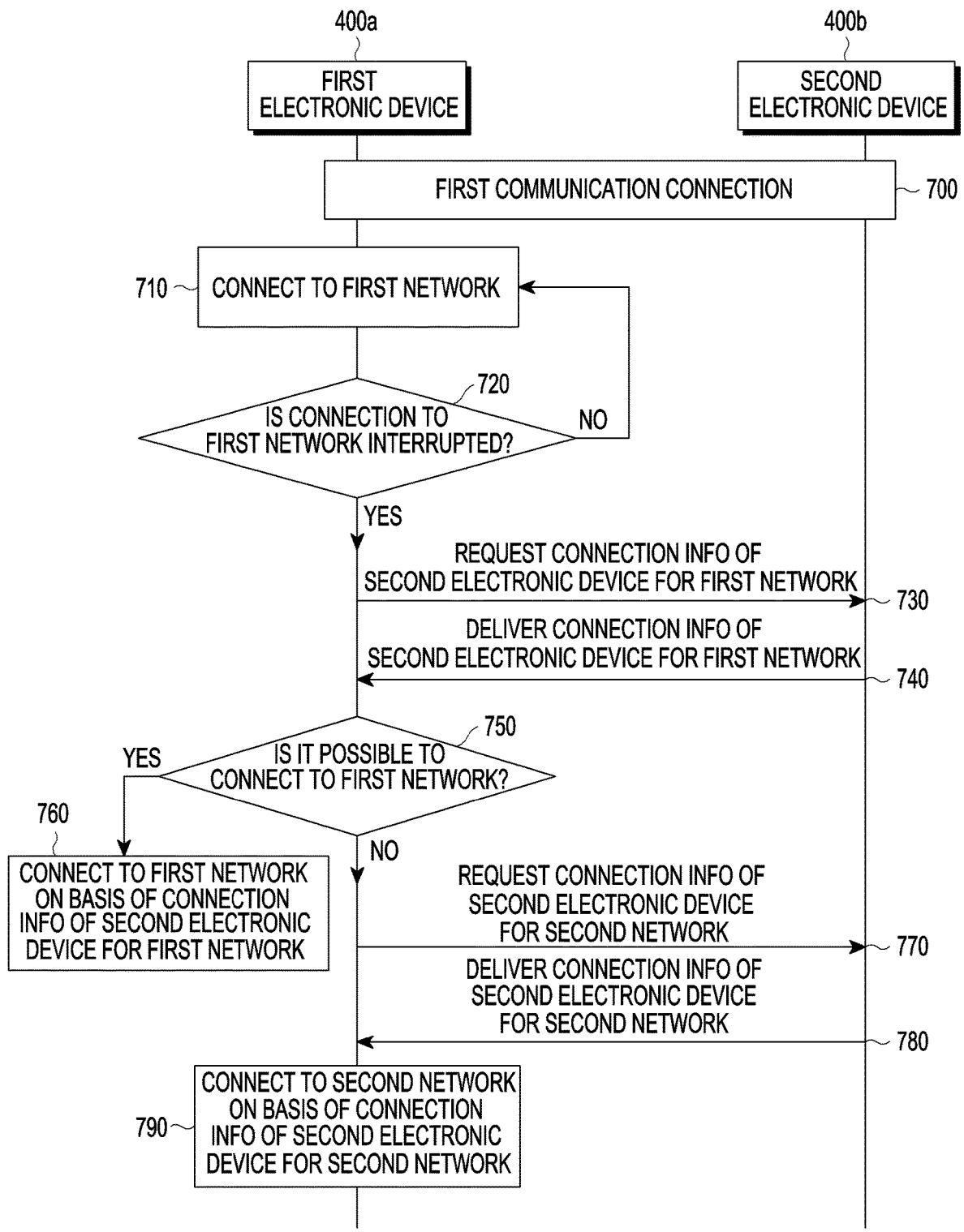
FIG. 7 illustrates a flow diagram between a first electronic device and a second electronic device for connecting the first electronic device and the second electronic device via first communication and connecting, by the second electronic device connected to the first electronic device via the first communication, to a first network or a second network according to various embodiments.

FIG. 7 illustrates a flow diagram between a first electronic device and a second electronic device for connecting the first electronic device and the second electronic device via first communication and connecting, by the second electronic device connected to the first electronic device via the first communication, to a first network or a second network according to various embodiments.

Referring to FIG. 7, in operation 700, the first electronic device 400a may establish a first communication connection with the second electronic device 400b.

According to an embodiment, the first electronic device 400a may periodically deliver beacon data to the second electronic device 400b. For example, the first electronic device 400a may periodically broadcast beacon data including device information of the first electronic device 400a. The second electronic device 400b may establish a first communication connection with the first electronic device 400a on the basis of the received beacon data.

In operation 710, the first electronic device 400a may connect to the first network. Operations 700 and 710 may be performed in order, or operation 710 may be performed before operation 700.

In operation 720, the first electronic device 400a may determine whether the connection of the first electronic device 400a to the first network is interrupted. When the connection of the first electronic device 400a to the first network is interrupted, the first electronic device 400a may perform operation 730. In contrast, when the connection of the first electronic device 400a to the first network is uninterrupted, the first electronic device 400a may return to operation 710 and may be continuously connected to the first network.

In operation 730, the first electronic device 400a may send a request for connection information of the second electronic device 400b for the first network, to the second electronic device 400b via the first communication.

In operation 740, the second electronic device 400b may deliver the connection information of the second electronic device 400b for the first network, to the first electronic device 400a via the first communication. For example, the connection information of the second electronic device 400b may include connection information of an AP to which the second electronic device 400b is currently being connected in order to connect to the first network, or connection information of at least one AP to which the second electronic device 400b has previously been connected in order to connect to the second network. The connection information of an AP may include the name, PIN number, and the like thereof.

In operation 750, the first electronic device 400a may determine whether the first electronic device 400a can connect to the first network, on the basis of the connection information of the second electronic device 400b for the first network. When the first electronic device 400a can connect to the first network, the first electronic device 400a may perform operation 760. In contrast, when the first electronic device 400a cannot connect to the first network, the first electronic device 400a may perform operation 770.

In operation 760, the first electronic device 400a may connect to the first network on the basis of the connection information of the second electronic device 400b for the first network.

In operation 770, the first electronic device 400a may send a request for connection information of the second electronic device 400b for the second network, to the second electronic device 400b via the first communication.

In operation 780, in response to the request, the second electronic device 400b may deliver the connection information of the second electronic device 400b for the second network, to the first electronic device 400a via the first communication.

In operation 790, the first electronic device 400a may connect to the second network on the basis of the connection information of the second electronic device 400b for the second network.

According to an embodiment, the second electronic device 400b may perform a wireless AP function such that the same serves as a wireless AP. For example, a wireless AP function may be a wireless tethering function of: connecting an electronic device capable of accessing a wireless LAN to a wireless terminal operating as an AP; and allowing the electronic device to connect to an IP-based network, such as the Internet, through a wireless data network, such as GPRS, WCDMA, or LTE, which is registered in the wireless terminal. For example, the wireless AP function may be conventionally referred to as a "Wi-Fi tethering", "Wi-Fi hotspot", "portable hotspot", or the like.

Figure 8:
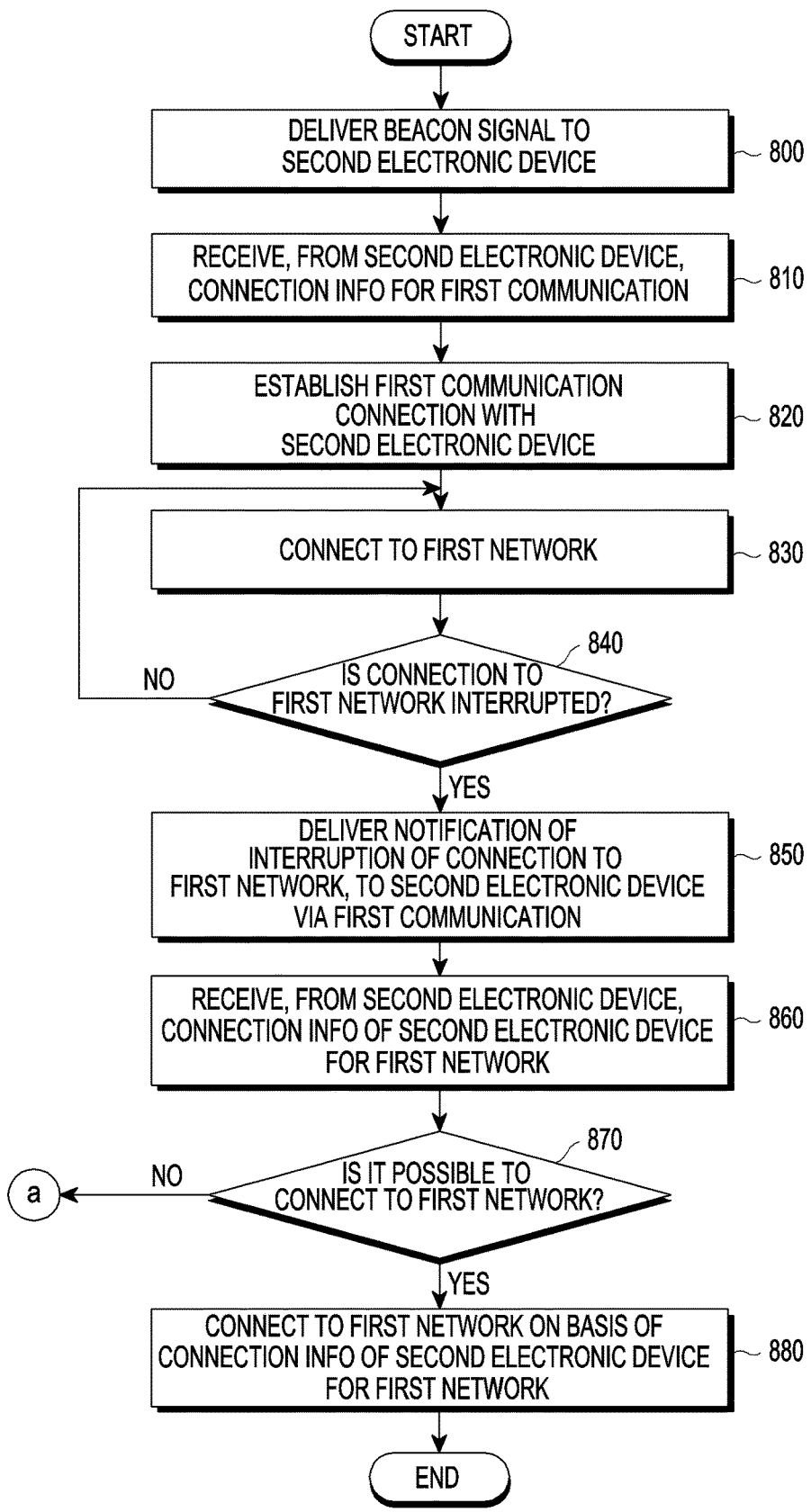
FIGS. 8 and 9 are flowcharts illustrating a process for connecting to a first network or a second network by a first electronic device according to various embodiments.
Figure 9:
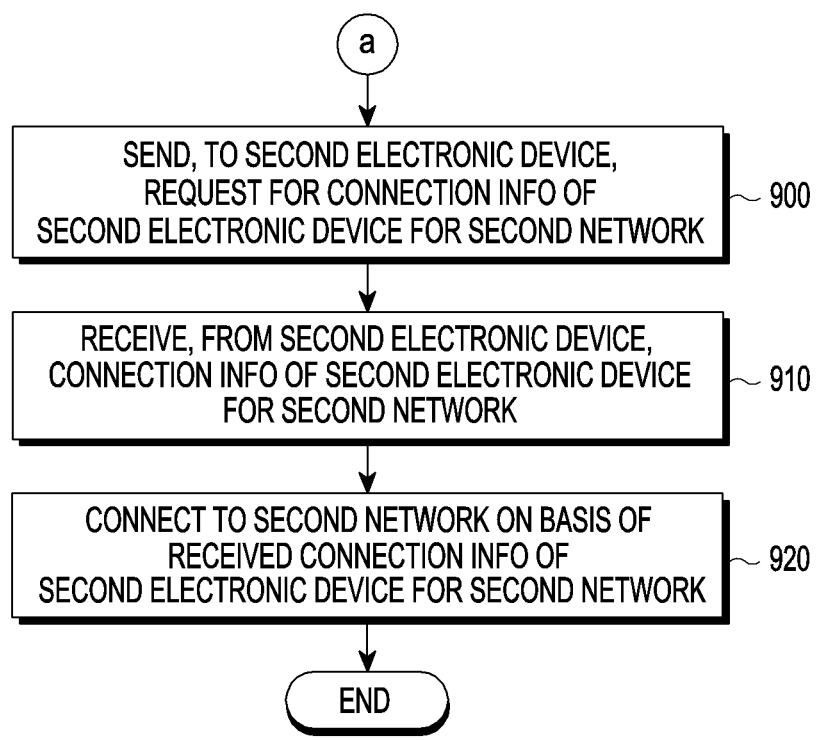

FIGS. 8 and 9 are flowcharts illustrating a process for connecting to a first network or a second network by a first electronic device according to various embodiments. According to various embodiments, operations 800 to 880 and operations 900 to 920 may be performed by the electronic device 101, 104, or 201, the first electronic device 400a, the server 106, the processor 120, 210, or 410a, and the program module 310.

Referring to FIG. 8, in operation 800, the first electronic device 400a may deliver a beacon signal to the second electronic device 400b. According to various embodiments, the first electronic device 400a may broadcast a beacon signal including device information of the first electronic device 400a.

In operation 810, the first electronic device 400a may receive, from the second electronic device 400b, connection information for first communication. The connection information for the first communication may include access information of the second electronic device 400b for a first communication connection.

In operation 820, the first electronic device 400a may establish a first communication connection with the second electronic device 400b. According to an embodiment, the first electronic device 400a may establish a first communication connection with the second electronic device 400b on the basis of access information, including the name, PIN number, and the like of the second electronic device 400b.

In operation 830, the first electronic device 400a may connect to the first network. According to an embodiment, the first electronic device 400a may discover an access apparatus such as an AP configured to connect to the first network, may connect to the discovered access apparatus, and may connect to the first network.

In operation 840, the first electronic device 400a may determine whether the connection thereof to the first network is interrupted. When the connection thereof to the first network is interrupted, the first electronic device 400a may perform operation 850. In contrast, when the connection thereof to the first network is uninterrupted, the first electronic device 400a may return to operation 830 and may be continuously connected to the first network.

In operation 850, the first electronic device 400a may deliver notification of interruption of the connection to the first network, to the second electronic device 400b via the first communication. The notification of interruption of the connection to the first network may include a request for connection information of the second electronic device 400b for the first network.

According to various embodiments, when the connection of the first electronic device 400a to the first network is interrupted, instead of delivering the notification of interruption of the connection to the first network to the second electronic device 400b, the first electronic device 400a may send a request for a network connection state of the second electronic device 400b, to the second electronic device 400b via the first communication. The network connection state may include information on a network to which the second electronic device 400b is currently being connected.

When the network connection state of the second electronic device 400b is received from the second electronic device 400b, the first electronic device 400a may check a network to which the second electronic device 400b is currently being connected, on the basis of the received network connection state of the second electronic device 400b.

When the second electronic device 400b is being connected to the first network, the first electronic device 400a may send a request for connection information for the first network, to which the second electronic device 400b is currently being connected, to the second electronic device 400b via the first communication. When the second electronic device 400b is being connected to the second network or is not connected to any network, the first electronic device 400a may send a request for connection information for the first network, to which the second electronic device 400b has previously been connected, to the second electronic device 400b via the first communication.

In operation 860, the first electronic device 400a may receive, from the second electronic device 400b, the connection information of the second electronic device 400b for the first network. For example, the connection information of the second electronic device 400b for the first network may include connection information for the first network to which the second electronic device 400b is being connected, or connection information for the first network to which the second electronic device 400b has previously been connected. The connection information for the first network may include the name, PIN number, and the like of at least one AP configured to connect to the first network.

In operation 870, the first electronic device 400a may determine whether the first electronic device 400a can connect to the first network. When the first electronic device 400a can connect to the first network, the first electronic device 400a may perform operation 880. In contrast, when the first electronic device 400a cannot connect to the first network, the first electronic device 400a may proceed with operation 900 of FIG. 9.

In operation 880, the first electronic device 400a may connect to the first network on the basis of the connection information of the second electronic device 400b for the first network.

For example, when the second electronic device 400b is connected to the first network, the first electronic device 400a: may receive connection information of the second electronic device 400b for the first network, wherein the connection information includes access information of an AP connected to the second electronic device 400b; may connect to the relevant AP by using the received connection information; and may connect to the first network through the AP.

In contrast, when the second electronic device 400b is not connected to the first network, the first electronic device 400a: may receive connection information of the second electronic device 400b for the first network, wherein the connection information includes access information of at least one AP to which the second electronic device 400b has previously been connected; may connect to one AP among the at least one AP by using the received connection information; and may connect to the first network through the AP.

Referring to FIG. 9, in operation 900, the first electronic device 400a may send a request for connection information of the second electronic device 400b for the second network, to the second electronic device 400b via the first communication. For example, the connection information of the second electronic device 400*b* for the second network may be access information of the second electronic device 400*b*. The second electronic device 400*b* may operate as a wireless AP.

In operation 910, the first electronic device 400*a* may receive, from the second electronic device 400*b*, the connection information of the second electronic device 400*b* for the second network.

In operation 920, the first electronic device 400*a* may connect to the second network on the basis of the received connection information of the second electronic device 400*b* for the second network. For example, the first electronic device 400*a* may connect to the second electronic device 400*b* on the basis of access information of the second electronic device 400*b* included in the connection information of the second electronic device 400*b* for the second network, and may connect to the second network through the second electronic device 400*b*.

According to various embodiments, the first electronic device 400*a* may determine whether the first electronic device 400*a* leaves a first network area, by detecting the movement of the first electronic device 400*a* by using an acceleration sensor, a GPS, or the like included in the first electronic device 400*a*. When the first electronic device 400*a* is determined to leave the first network area, the first electronic device 400*a* may send a request for connection information of the second electronic device 400*b* for the first network, to the second electronic device 400*b* that is connected to the first electronic device 400*a* via the first communication.

Figure 10:
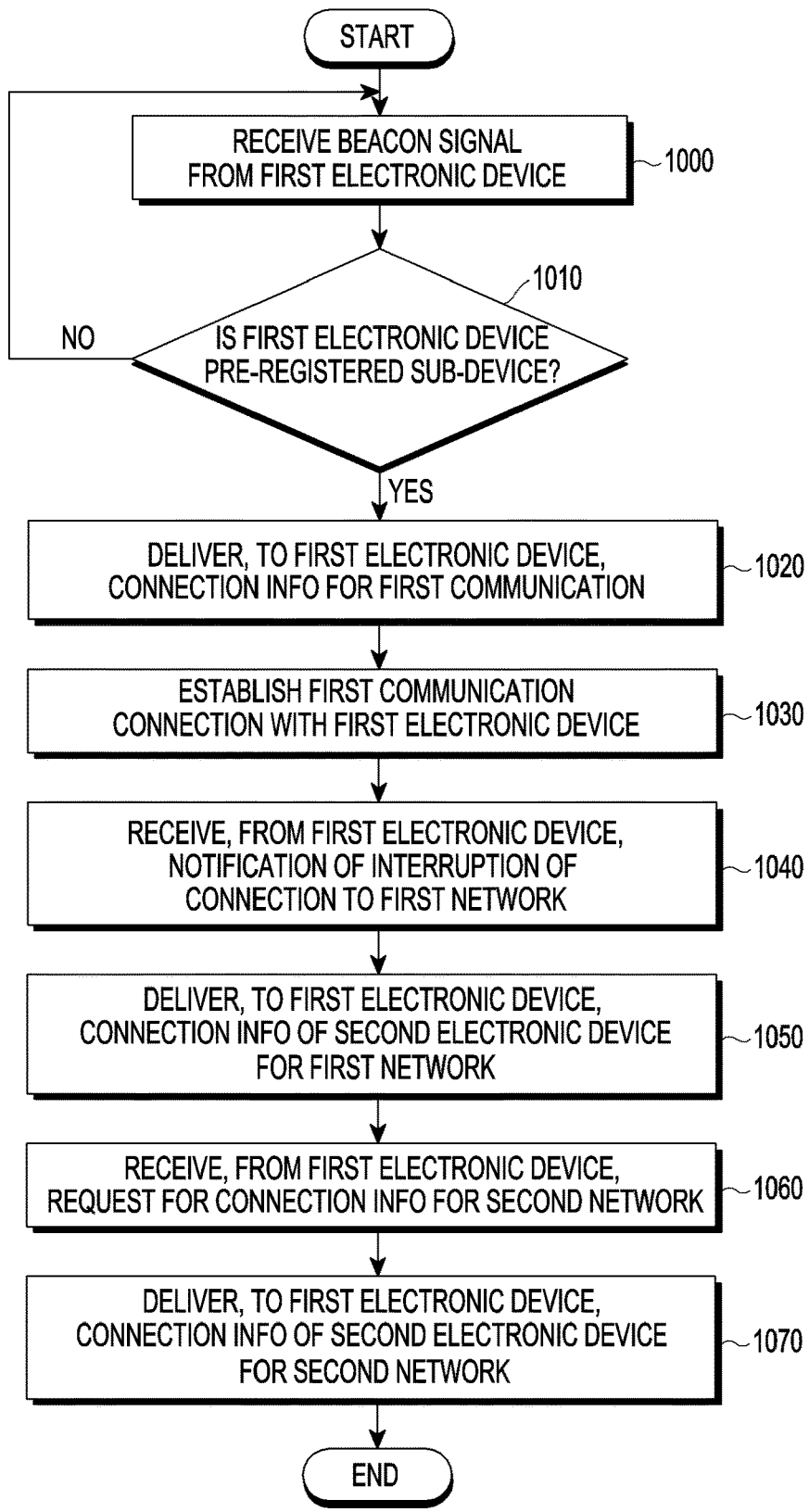
FIG. 10 is a flowchart illustrating a process for connecting a first electronic device to a first network or a second network by a second electronic device according to various embodiments.

FIG. 10 is a flowchart illustrating a process for connecting a first electronic device to a first network or a second network by a second electronic device according to various embodiments. According to various embodiments, operations 1000 to 1070 may be performed by the electronic device 101, 104, or 201, the second electronic device 400*b*, the server 106, the processor 120, 210, or 410*b*, and the program module 310.

Referring to FIG. 10, in operation 1000, the second electronic device 400*b* may receive a beacon signal from the first electronic device 400*a*. The beacon signal may include device information of the first electronic device 400*a*.

In operation 1010, the second electronic device 400*b* may determine whether the first electronic device 400*a* is a pre-registered sub-device. When the first electronic device 400*a* is a pre-registered sub-device, the second electronic device 400*b* may perform operation 1020. In contrast, when the first electronic device 400*a* is not a pre-registered sub-device, the second electronic device 400*b* may repeatedly perform operation 1000.

In operation 1020, the second electronic device 400*b* may deliver, to the first electronic device 400*a*, connection information for first communication. The connection information for the first communication may include access information of the second electronic device 400*b* for a first communication connection.

In operation 1030, the second electronic device 400*b* may establish a first communication connection with the first electronic device 400*a*. For example, the first communication may be short-range communication, such as Bluetooth.

In operation 1040, the second electronic device 400*b* may receive notification of interruption of the connection to the first network, from the first electronic device 400*a* via the first communication.

In operation 1050, the second electronic device 400*b* may deliver connection information of the second electronic device 400*b* for the first network, to the first electronic device 400*a* via the first communication. For example, when the second electronic device 400*b* is currently being connected to the first network, the connection information of the second electronic device 400*b* for the first network may be access information of an AP for the first network to which the second electronic device 400*b* is currently being connected. Alternatively, when the second electronic device 400*b* is not connected to the first network (e.g., when the second electronic device 400*b* is being connected to the second network or is not connected to any network), the connection information of the second electronic device 400*b* for the first network may be access information of at least one AP for the first network to which the second electronic device 400*b* has previously been connected. According to various embodiments, even when the second electronic device 400*b* is being connected to the first network, connection information of the second electronic device 400*b* for the first network may include access information of at least one AP for the first network to which the second electronic device 400*b* has previously been connected.

In operation 1060, the second electronic device 400*b* may receive a request for connection information for the second network, from the first electronic device 400*a* via the first communication. For example, a request for connection information for the second network may be a request for connection information of the second electronic device 400*b* for the second network.

In operation 1070, the second electronic device 400*b* may deliver the connection information of the second electronic device 400*b* for the second network, to the first electronic device 400*a* via the first communication. For example, the connection information of the second electronic device 400*b* for the second network may include access information of the second electronic device 400*b* for a connection to the second network. The second electronic device 400*b* may operate as a wireless AP configured to connect to the second network.

As described above, in various embodiments of the present disclosure, even when the connection of a first electronic device to a first network is interrupted, without the need for a user to search for and select a device in order to connect to a network, the first electronic device can conveniently connect to the first network on the basis of connection information of a second electronic device for the first network provided by the second electronic device.

The term "module" as used herein may include a unit implemented in hardware, software, or firmware, and for example, may be used interchangeably with the term "logic", "logical block", "component", "circuit", or the like. The "module" may be an integrated component, or a minimum unit for performing one or more functions or a part thereof. The "module" may be mechanically or electronically implemented, and may include, for example, an Application-Specific Integrated Circuit (ASIC) chip, a Field-Programmable Gate Array (FPGA), or a programmable logic device which performs certain operations and is already known or is to be developed in the future. At least part of the device (e.g., modules or functions thereof) or the method (e.g., operations) according to various embodiments of the present disclosure may be implemented by an instruction which is stored in a computer-readable storage medium (e.g., the memory 130) in the form of a program module. When the instruction is executed by a processor (e.g., the processor 120), the processor may perform a function corresponding to the instruction. Examples of the computer-readable recording medium may include: magnetic media, such as a hard disk, a floppy disk, and a magnetic tape; optical media, such as a Compact Disc Read Only Memory (CD-ROM) and a Digital Versatile Disc (DVD); magneto-optical media, such as a floptical disk; an internal memory; and the like. The instructions may include a code made by a compiler or a code which can be executed by an interpreter. The module or program module according to various embodiments of the present disclosure may include at least one of the aforementioned elements, may further include other elements, or some of the aforementioned elements may be omitted. Operations executed by the module, program module, or other elements according to various embodiments of the present disclosure may be executed sequentially, in parallel, repeatedly, or in a heuristic manner. Alternatively, at least some operations may be executed in a different order or may be omitted, or other operations may be added.

What is claimed is:

1. An electronic device comprising:
    a communication module;
    a processor electrically connected to the communication module; and
    a memory electrically connected to the processor,
    wherein the memory stores instructions that, when executed, cause the processor to:
    establish a connection to a first network;
    when the connection to the first network is interrupted,
    send, to a second electronic device, a request for first connection information of the second electronic device for the first network;
    receive the first connection information of the second electronic device for the first network from the second electronic device, and establish a first connection to the first network on the basis of the received first connection information of the second electronic device for the first network;
    send, to the second electronic device, a request for second connection information of the second electronic device for a second network when the first connection to the first network, based on the received first connection information of the second electronic device for the first network, fails; and
    receive the second connection information of the second electronic device for the second network from the second electronic device, and establish a second connection to the second network via the second electronic device which is an access point on the basis of the received second connection information of the second electronic device for the second network,
    wherein the first network is a wireless local area network, and the second network is a cellular network.

2. The electronic device of claim 1, wherein the electronic device is connected to the second electronic device via first communication, and wherein the first communication is Wi-Fi communication.

3. The electronic device of claim 2, wherein the first connection information of the second electronic device for the first network comprises:
    connection information for the first network to which the second electronic device is being connected, or
    connection information for the first network to which the second electronic device has previously been connected.

4. The electronic device of claim 2, wherein the instructions, when executed, cause the processor to:
    when the connection to the first network is interrupted,
    deliver a notification for notifying of the interruption of the first connection to the first network to the second electronic device via the first communication; and
    receive the first connection information of the second electronic device for the first network, as a response to the notification.

5. The electronic device of claim 2, wherein the second electronic device determines whether the electronic device is a pre-registered sub-device, and performs the first communication with the electronic device when the electronic device is the pre-registered sub-device.

6. The electronic device of claim 1, wherein the first connection information for the second network comprises access information of the second electronic device.

7. A method for connecting to a network by an electronic device, the method comprising:
    establishing a connection to a first network;
    when the connection to the first network is interrupted,
    sending, to a second electronic device, a request for first connection information of the second electronic device for the first network;
    receiving the first connection information of the second electronic device for the first network from the second electronic device, and establishing a first connection to the first network on the basis of the received first connection information of the second electronic device for the first network;
    sending, to the second electronic device, a request for second connection information of the second electronic device for a second network when the first connection to the first network, based on the received first connection information of the second electronic device for the first network, fails; and
    receiving the second connection information of the second electronic device for the second network from the second electronic device, and establishing a second connection to the second network via the second electronic device,
    wherein the first network is a wireless local area network, and the second network is a cellular network.

8. The method of claim 7, wherein the electronic device is connected to the second electronic device via first communication, and wherein the first communication is Wi-Fi communication.

9. The method of claim 8, wherein the sending of the request for the first connection information of the second electronic device for the first network comprises:
    when the connection to the first network is interrupted,
    delivering notification for notifying of interruption of the connection to the first network, to the second electronic device via the first communication.

10. The method of claim 8, wherein the second electronic device determines whether the electronic device is a pre-registered sub-device, and performs the first communication with the electronic device when the electronic device is the pre-registered sub-device.

11. The method of claim 7, wherein the first connection information of the second electronic device for the first network of the electronic device comprises:
    connection information for the first network to which the second electronic device is being connected, or
    connection information for the first network to which the second electronic device has previously been connected.

12. The method of claim 7, wherein the first connection information for the second network comprises access information of the second electronic device.

13. The method of claim 12, wherein the second electronic device operates as an access point configured to connect to the second network.

\* \* \* \* \*